United States Patent
Meaney et al.

(10) Patent No.: US 7,222,270 B2
(45) Date of Patent: May 22, 2007

(54) METHOD FOR TAGGING UNCORRECTABLE ERRORS FOR SYMMETRIC MULTIPROCESSORS

(75) Inventors: Patrick J. Meaney, Poughkeepsie, NY (US); Gary A. VanHuben, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 10/340,460

(22) Filed: Jan. 10, 2003

(65) Prior Publication Data

US 2004/0139374 A1    Jul. 15, 2004

(51) Int. Cl.
*G06F 11/00* (2006.01)
(52) U.S. Cl. .............................. 714/48; 714/41; 714/42; 714/52
(58) Field of Classification Search ................... 714/48, 714/52, 42, 41
See application file for complete search history.

(56) References Cited

U.S. PATENT DOCUMENTS

| | | | |
|---|---|---|---|
| 6,536,000 B1* | 3/2003 | Jackson et al. ................ 714/57 |
| 6,594,785 B1* | 7/2003 | Gilbertson et al. ........... 714/48 |
| 6,751,756 B1* | 6/2004 | Hartnett et al. ............... 714/54 |
| 6,823,476 B2* | 11/2004 | Williams et al. .............. 714/25 |
| 2004/0153842 A1* | 8/2004 | Dickey et al. ................. 714/42 |

* cited by examiner

*Primary Examiner*—Robert Beausoliel
*Assistant Examiner*—Charles Ehne
(74) *Attorney, Agent, or Firm*—Lynn L. Augspurger

(57) ABSTRACT

A method for identifying, managing, and signaling uncorrectable errors among a plurality of clusters of symmetric multiprocessors (SMPs) detects, manages and reports data errors. The method allows merging of newly detected errors, including memory, cache, control, address, and interface errors, into existing error status. Also, error status is distributed in several possible formats, including separate status signals, special UE (uncorrectable errors) ECC codewords, encoded data patterns, parity error injection, and response codepoints. The error status is also available for logging and analysis while the machine is operating, allowing for recovery and component failure isolation as soon as the errors are detected without stopping the machine.

14 Claims, 9 Drawing Sheets

METHOD FOR TAGGING UNCORRECTABLE ERRORS FOR SYMMETRIC MULTIPROCESSORS

FIELD OF THE INVENTION

This invention is related to computer systems and particularly to a method for identifying, managing, and signaling uncorrectable errors among a plurality of clusters of symmetric multiprocessors (SMPs).

Trademarks: S/390® and IBM® are registered trademarks of International Business Machines Corporation, Armonk, N.Y., U.S.A.. Other names may be registered trademarks or product names of International Business Machines Corporation or other companies.

BACKGROUND OF THE INVENTION

Today's e-business environment places great demands on the reliability and availability of computer systems that drive their infrastructure. The rising density of circuits and interconnects, coupled with the need to run computer systems continuously, leads to an increased potential for hardware errors. Historically computer systems have employed a variety of methods to deal with errors that occur within the data being transferred throughout the system. Low end systems tend to protect the data with parity bits which usually results in the need to reboot the system whenever such a parity error occurs.

An improvement on this approach is the use of error correction codes (ECC) to detect correctable and uncorrectable errors. Correctable errors are situations where a small number of bits flip (typically one), and the ECC code is able to calculate exactly which bits flipped and revert them back to their original state. The data correction is typically done "on the fly" while the data is being transferred. Uncorrectable errors are situations where too many bits flip (typically two or more) such that the ECC code can't detect exactly which bits flip. In low end and midrange systems, these UEs (uncorrectable errors) generally result in the need to reboot the computer system. However, in high end system such as the S/390® Enterprise Servers, uncorrectable errors are further classified depending on the originating location of the error. This, in turn, determines the type of recovery action taken. Recovery actions range from operating system machine checks to isolated CPs undergoing recovery to the entire system hard stopping and requiring IML (reboot).

Since the originating location of the error determines the type of recovery, recent high end systems such as the IBM® S/390® G5 and G6 Enterprise Servers have relied on a technique of storing special ECC code points (known as Special UEs) whenever an error is encountered in a data stream residing in main memory. During subsequent attempts to fetch that data, the data flow detects the Special UE and indicates to the processor that the line of storage in unusable. This technique allows the processor to differentiate between main memory storage errors, hardware errors in the shared Level 2 cache and surrounding subsystem, or errors occurring within the processor's own data flow. Although this scheme affords the advantage of invoking more granular types of recovery, the recent implementations have focused mostly on recovery from main memory storage errors and errors in the processor data flow, but have paid little attention to the remainder of the system.

There is a prevalent use of error and hardware defect detection circuitry in large computer systems. Many of today's systems are adept at identifying these errors and properly recovering from correctable error situations. However, lacking is a satisfactory way of managing uncorrectable errors for a variety of interfaces and storage elements, and conveying information about said errors to permit appropriate recovery actions.

U.S. Pat. No. 6,163,857, entitled Computer System UE Recovery Logic, issued to Meaney et al., provides for a UE recovery system with a cache, memory and central processors.

U.S. Pat. No. 5,953,351, entitled Method and Apparatus for Indicating Uncorrectable Data Errors, issued to Hicks et al., provides a means of generating Error Correction Code (ECC) check bits for the purposes of indicating Uncorrectable Errors (UEs) to the processor.

U.S. Pat. No. 4,761,783, entitled Apparatus and Method for Reporting Occurrences of Errors in Signals Stored in a Data Processor, issued to Christensen, et al., provides an apparatus for reporting errors that occur in either main storage or a storage element such as a cache.

U.S. Pat. No. 5,111,464, entitled Interrupt Reporting for Single Bit Errors, issued to Farmwald et al., focuses on an apparatus to detect memory errors and isolate the failing memory circuit. Furthermore, it teaches an intelligent method of reporting such that the processor is notified only when an occurrence of an error specifies a different circuit from that of the previous error occurrence. This method avoids unwanted processor interrupts resulting from repetitive accesses to the same memory locale in the event of a hardware failure.

U.S. Pat. No. 5,361,267, entitled Scheme for Error Handling in a Computer System, issued to Godiwala et al., focuses on a shared system bus design whereby data errors on memory read transactions can result in inefficiencies in the throughput of the system bus.

U.S. Pat. No. 5,535,226, entitled On-Chip ECC Status, issued to Drake et al., teaches a means of detecting errors within a memory storage element such as a dynamic random access memory (DRAM) and storing the status of said error detection.

U.S. Pat. No. 5,604,755, entitled Memory System Reset Circuit, issued to Bertin et al., provides a reset circuit for resetting a memory system following a radiation event.

These references include the use of a predetermined pattern of ECC Check Bits (sometimes referred to as Special UE or SPUE codes) to signal the occurrence of an uncorrectable error. Additionally, they all employ Error Correction Code (ECC) circuitry to detect and signal the presence of correctable and uncorrectable errors. Furthermore, most of them include a way of communicating a memory or storage UE to the processor. While all these aspects are important, they fail to provide a fully satisfactory solution.

SUMMARY OF THE INVENTION

In accordance with the preferred embodiment of our invention we provide a combination of special ECC code points and a network of status or "tag" latches interspersed throughout the System Controller (SC) data flow. This permits accurate tracking of the error status for eventual reporting to the receiving processor. In accordance with an advantageous feature of our our invention we have provided the ability to accurately differentiate between main storage UEs and hardware errors originating within the System Controller (SC). This level of tracking is even maintained during complex data transfers involving short term storage in data buffers, mid term storage within the Level 2 cache and long term storage in main memory.

As data moves through the various data buffers and holding registers, a system of tag latches captures the status signals from the ECC stations or UE indications on the various chip interfaces. The ECC stations are capable of differentiating between SC errors (such as broken wires, latches, alpha particles, etc.) or special UEs indicative of main storage UEs or errors found earlier in the SC and stored as special UEs in the L2 cache. Upon detecting an error, the ECC station reports the type of error (Memory UE or SC UE) to the appropriate tag latch corresponding to the destination buffer or holding register.

In complex system such as were found in IBM's S/390 servers, the data may traverse several way points in the SC data flow before finally arriving at the final destination for the operation. IN accordance with our invention, the tag latches operate in pairs comprising a Memory UE tag and an SC UE tag. Holding registers utilize a single pair of tag latches while the data buffers employ two pairs of latches. This mechanism permits a second buffer write operation to commence while a first buffer read operation is still in progress, and ensure the status of the initial write operation is not altered by the second write operation. The present invention capitalizes on the fact that data in the SC is managed on a line basis, and any recovery action taken by a processor is dictated by the first error indication received by the processor. In other words, once any word (4 bytes) encounters an error, our invention marks the entire line with that status because there's no advantage in tracking each word individually. This permits a more advantageous implementation in both latch savings and frequency, especially for large 16 DW (256 byte) buffers.

For most operations, the final destination is either a processor (i.e.. a data or instruction fetch), the Level 2 Cache, main memory, or some combination thereof. For those operations involving data storage into the L2 cache or main memory, in accordance with the preferred embodiment of our invention we provide a mechanism which monitors the various tag latches and uses them to inject a special UE code corresponding to the originating location of the error. For example, if data is being fetched from main memory and being stored into the L2 cache, and it contains a storage UE, then the corresponding DW is replaced with all zeros for the data pattern and '01'x for the ECC code. Conversely, if the data encounters an SC UE in transit to the cache, then the corresponding DW is replaced with all zeros and an '40'x ECC code. In either case, all remaining DWs in the line being stored are also marked with the same special UE pattern. When the data is subsequently read out of the cache or main memory, the ECC stations recognize the '40'x and '01'x codes and set the appropriate signal, which in turn sets the tag latches. The tag latches and special UE injection mechanisms work in concert to maintain the UE status of each line until the line is eventually requested by a processor.

Once a processor requests a line containing a UE or a special UE code, our invention provides unique signaling mechanisms for each type of error. In the case of an SC UE, the data valid signal, which normally accompanies each DW being transferred, is blocked. For memory storage UEs, the present invention employs a separate UE indicator which also accompanies each DW. Since the processor will invoke the necessary recovery action upon receipt of the first error indicator, the status of the remaining words in the line are "don't cares". Once again, we have enabled in accordance with our invention this to be exploited by only tracking status at the granularity of the line as opposed to each individual words. When the processor receives the memory UE indicator, it presents a machine check to the operating system, which takes that region of main memory off line. Conversely, if the processor encounters a missing data valid, it can invoke processor recovery in hopes that the cause of the error is intermittent. Since the processor-does attempt recovery, our preferred embodiment affords the opportunity to keep the system running in situations where previous systems would have required a system reboot. In addition, the use of individual signals to indicate UE status contributes to the high frequency performance of the processor by eliminating the need to decode bit patterns within the data stream, such as zero data with bad parity The preferred embodiment exploits the System Controller (SC) data flow structure by implementing triple redundant copies of the Memory UE signal between the 4 SD chips and a processor chip. In a prior implementation the Memory UE signal was bundled in a parity group with the valid data signal. Thus, if the Memory UE signal was erroneously activated (thereby causing a parity check in the CP), then the processor had to assume the memory error was valid and take the page off line. With the current triple redundancy, it permits the processor to "vote" among the 4 copies, and treat any mismatch with less than 3 copies active as an SCE UE. Thus, in cases where only 1 or 2 of the UE indicators activated, the processor can invoke CP Recovery and retain the page.

In addition to providing the necessary granularity for invoking recovery actions, the UE tagging mechanism also plays a role in improving the overall system Reliability, Availability and Serviceability (RAS) in a multi-cluster system configuration. We have accomplished this by replacing the original data pattern with all zeros and good ECC prior to the data leaving the source cluster in which it encountered the error. This prevents any downstream ECC stations from rediscovering the UE and triggering multiple FRU calls.

Another aspect of the present invention pertains to the interaction between the UE tagging hardware and the firmware. Historically, the UE status was recorded in a "who's on first" Error Report Register (ERR) which could only be accessed by stopping the system clocks and accessing the contents of the ERR through the use of Level Sensitive Scan Design (LSSD). The present preferred embodiment of our invention utilizes a millicode accessible ERR register to store the FRU (Field Replaceable Unit) information corresponding to the UE incident. This enables the millicode to dynamically poll the ERR and make on-the-fly FRU calls with the accuracy afforded by the improvement cited above.

Our illustrated embodiment further reduces data integrity exposure by not only parity protecting the UE tag latches, but distributing the parity to all recipients of the UE tag information. In the event a UE tag is in bad parity, the information conveyed by the UE tags can't be trusted, and therefore the data is presumed to be in error. This is superiour to prior designs, where, if the data was in error and the UE tag encountered a false reset, the recipient would interpret it as good data thereby creating a potential data integrity (DI) exposure. The present embodiment incorporates parity checks on UE tags into the existing reporting scheme by managing them as SCE UEs.

With regards to UE tagging for buffers, the present invention employs a mechanism for pipe lining the UE tags to allow a read access of a first line of data while a simultaneous write of a second line is occurring. Our invention ensures that accurate UE status is conveyed to the recipient of the data even when the first and second lines of data belong to two different requesters.

In the area of I/O recovery, the preferred embodiment exemplifies how a unified and consistent UE tagging strategy can be applied to an interface that is void of any kind of dedicated UE indicators. Since many industry standard I/O interfaces don't provide dedicated UE status signals, our invention incorporates logic to force zero data with bad parity to indicate an error. It further exploits the triple redundancy of the Memory UE signals to force bad parity on all four data words for true Memory UEs, while only forcing bad parity on one word of data in the case of a System Controller UE. The present invention demonstrates how the tagging scheme can be used in timing critical portions of the design to achieve higher frequencies, but then can be converted to more traditional means of data encoding to save chip or package I/O.

These, and other objects, features and advantages of this invention will become apparent from the following detailed description of the various aspects of the invention in conjunction with the accompanying drawings.

DETAILED DESCRIPTION OF THE INVENTION

Further understanding of the present invention may be gained by a brief explanation of the system structure. The preferred embodiment is incorporated into an Symmetric Multiprocessing (SMP) System comprising a plurality of Central Processors, each having a private L1 cache, a plurality of I/O Adapters, and a Main Memory wherein any Processor or I/O Adapter can access any portion of the memory. The total number of Processors and I/O Adapters are divided into a plurality of clusters. In addition, the Main Memory is comprised of banks or interleaves attached to each cluster.

Within each cluster there exists a System Controller Element (SCE), which consists of a system coherency management unit, cluster shared cache, various controllers, and discrete interfaces (or ports) to every Processor, I/O Adapter, and the Main Memory. The cache represented in the present embodiment is comprised of a plurality of interleaves and the contents are managed by a 16-way associative directory. The System Controller also contains a corresponding data flow comprising the shared Level 2 cache, a plurality of buffers and registers for transferring data from a variety of sources to the desired destination, and a variety of cross point switches.

The primary function of the System Controller Element is to process data fetch and store requests coherently between the Processors and I/O Adapters and the system's Main Memory. Since the System Controller contains a shared cache, which is architecturally invisible to the software and operating system, the System Controller is also responsible for performing directory and cache accesses. All incoming requests enter a port on the System Controller, where they are received by a Central Processor Controller (CFAR) or I/O Controller. These controllers generate requests into a Central Priority unit which arbitrates among them and chooses one of the requesters to enter into one of two multistage Pipelines based on the address. During each stage of the pipeline the requester accesses and/or reserves various resources such as the cache, the Local Cache Fetch/Store Controllers, the data path controls, data path fifo buffers, the Remote Fetch/Store Controllers, etc. Once the appropriate resources are reserved, the controller continues with the necessary coherency actions and data transfers to complete the operation.

Occasionally, these data transfers encounter data errors which are either correctable or uncorrectable. The preferred embodiment contains Error Correction Code (ECC) circuitry which corrects single bit errors in-line as the data passes through it. In the event of a double-bit failure, the ECC circuitry detects and reports the error. As will be evident later in the detailed description, the present invention focuses on the management of these UE reports for purposes of conveying UE information to the requesting Central Processor and/or I/O Adapters using a plurality of interface communication methods.

Figure 1:
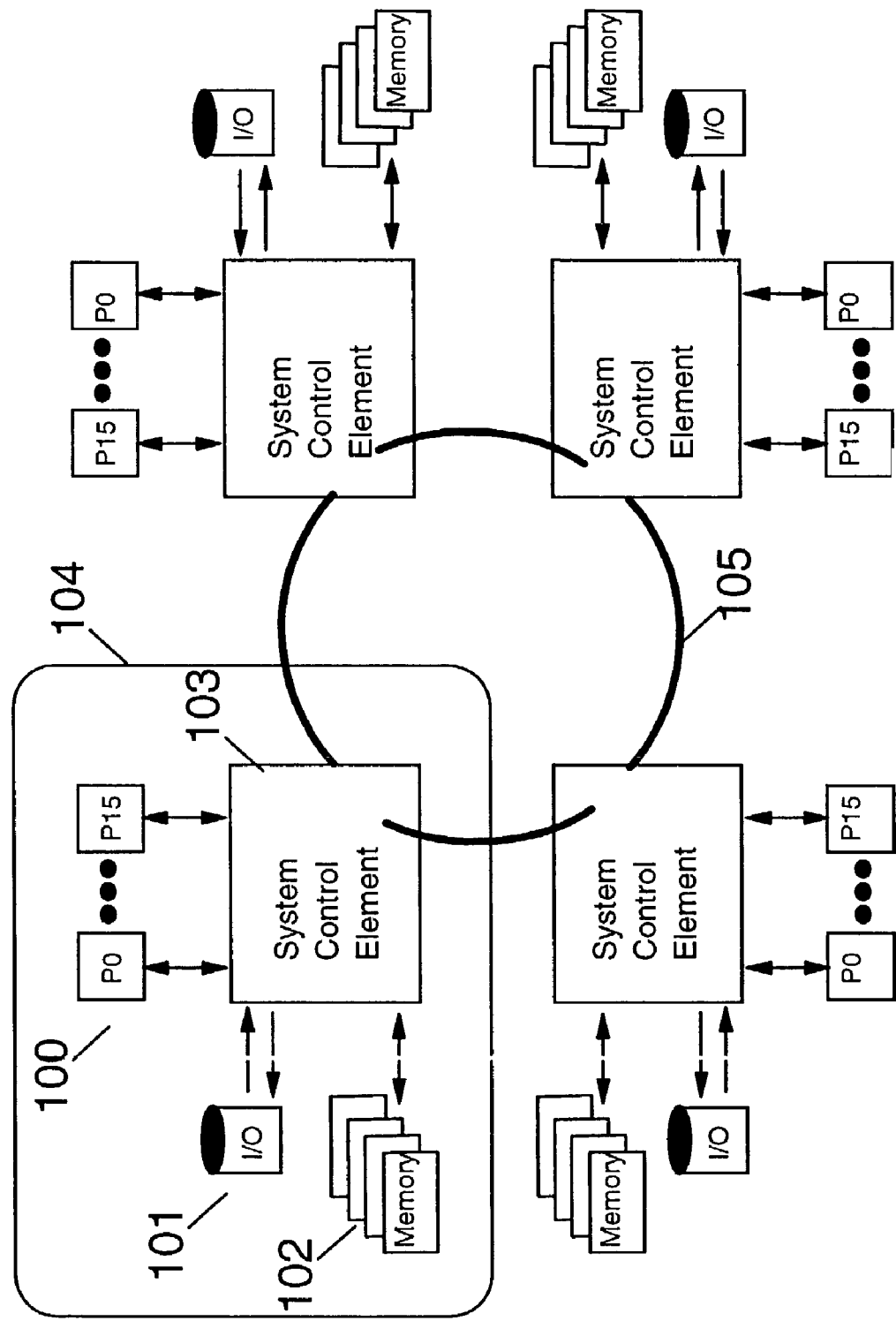
FIG. 1 depicts the overall structure of a multi-nodal computer system comprising Central Processors, I/O devices, Main Memory and a ring-like interconnect topology.

FIG. 1 depicts four nodes in a multi-nodal symmetric multiprocessor system. A single node (104) comprises the aforementioned System Controller Element (103) which provides interconnections and communications with a plurality of Central Processors (100), I/O devices (101), and main memory (102). The System Controller Element (103) contains the 16-way associative shared second level cache. Both the L2 cache and the main memory are accessible by a Central Processor or I/O device within that node (104) or any of the remaining three nodes in the system. Data fetch and store requests are initiated by the Central Processors or I/O devices, and are processed by the CFAR and I/O Controllers contained within the SCE (103).

Fetches that miss the L2 Cache are processed by the Memory Fetch Miss Controllers within the SCE who are responsible for initiating data accesses from main memory. In the case of store requests, those initiated from the Central Processors always hit in the L2 Cache and thereby terminate the operation with the deposition of the updated data into the cache. This is due to architectural requirements pertinent to the preferred embodiment whereby Central Processors acquire exclusive ownership of data prior to updating the data as part of store requests. Although Central Processors are required to own the data prior to update, this rule does not apply to I/O devices. Thus store requests initiating from I/O devices may or may not hit in the L2 cache. For those that miss, the operation is handed to Memory Store Miss Controllers within the SCE who initiate memory write operations.

Another important aspect of the system structure in FIG. 1, is the ring fabric (105) which serves to interconnect the four nodes. The ring fabric consists of two concentric rings in which traffic flows in opposite directions. Fetch and Store requests which miss the local L2 Cache within a node may target Main Memory or an L2 Cache on any of the other three nodes. Operations destined for other nodes are launched onto both rings simultaneously. For matters of system level coherency, both operations must pass through each adjacent node and meet at the diagonally opposite node. As the operation passes through each remote node remote fetch and store controllers interrogate the L2 cache on that remote node and perform any necessary system coherency actions. In the event the desired data is located in one of the remote caches, the data fetch or store operation is handled by these remote fetch and store controllers. Finally, if the operation misses all the caches (local and remote), it will eventually terminate at the node in which the target main memory resides. The target main memory is determined by address bits. Operations targeting a remote main memory are also handled by the remote fetch and store controllers.

Figure 2:
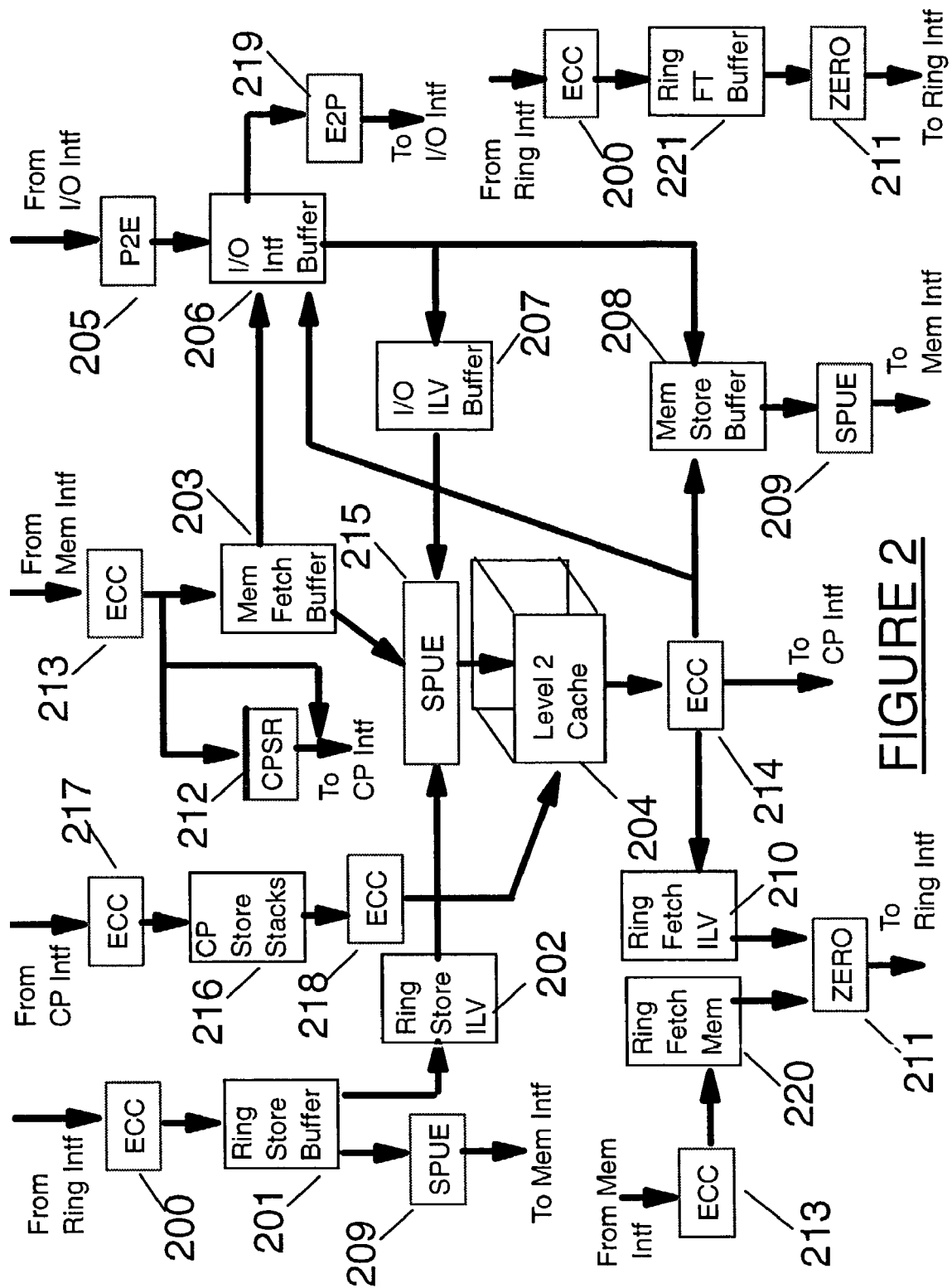
FIG. 2 illustrates the main data flow features within the System Controllers Element (SCE).

FIG. 2 illustrates the main elements of the SCE data flow. Data fetches initiated from a local Central Processor may hit or miss the Level 2 Cache (204). If the data hits in the cache, it passes through the Error Correction Code (ECC) station (214) which corrects any single bit errors and reports uncorrectable errors (UEs). In cases where the data misses the cache and must be acquired from the local main memory, the data passes through ECC station (213) which detects any errors from the main storage interface or from main storage itself. Additionally, local cache misses often result in the need to cast out a line in the cache to make room for the incoming fetch data.

The preferred embodiment utilizes a least recently used (LRU) algorithm to select a line from the cache to be transferred to the Memory Store Buffer (208). This data also passes through ECC station (214) prior to being written into the line buffer. The LRU operation completes with the data being accessed from the buffer and transferred to the Memory Interface. Our invention employs Special UE injection logic (209) to transform the outgoing data into all zeros and set the ECC check bits to '40'x if ECC Station (214) detects a UE.

The remaining portion of the fetch miss sequence involves storing copy of the fetch data into the cache. This involves the data passing through ECC station (213) and being written into Memory Fetch Buffer (203). Once the cache becomes available, the data is transferred from the buffer into the cache SRAM. In the event the ECC station (213) detects a UE, it's reported to Special UE injection logic (215) to write all zero data with the '40'x check bit pattern. Additionally, Special UE injections logic (215) can also be used to set the ECC check bits to '01'x if the memory interface indicates a Memory UE with the incoming data. In this manner, any data with UEs can be appropriately tagged while being stored into the cache so as not to be treated as valid data upon subsequent accesses.

The present invention handles store operations from the Central Processors differently than fetches. Data comes into ECC Station (217) from the CP Interface where it's written into the CP Store Stack buffer (216). As previously stated, the architecture of the preferred embodiment mandates that all CP Store operations hit in the L2 Cache. Thus, once the cache is available, the data is transferred from the Store Stack buffer into the cache (204). During this transfer, the data passes through ECC Station (218). Our invention employs a blocking mechanism which monitors the UE signals from either ECC Station (217 or 218). Unlike the CP Fetch Miss case in which UE data is injected with a SPUE code prior to being written into the cache, our invention actually inhibits the cache write operation for CP Stores. This is because CP Stores in the preferred embodiment have sufficient latency to permit the blocking of the write operation. It should be obvious to one skilled in the art, that alternate embodiments could utilize the same SPUE Injection Logic (215) to tag the UE data with the Special UE ECC code in applications where the cache write could not effectively be inhibited.

In addition to operand and instruction fetches, the Central Processors in the preferred embodiment may also initiate millicode operations which access status information from main storage. During these asynchronous "CP Sense" operations, the status data is returned over the memory data bus and deposited into the CP Sense Register (212) until such time the processor is ready to read it. Our invention also provides a means for tracking any UE indicators reported by ECC Station (213) corresponding to the data being loaded into said CP Sense Registers (212).

Continuing with FIG. 2, fetches and stores can also be initiated by local I/O Adapters. In the preferred embodiment, the I/O Adapters use a parity protected interface whereby the entire internal data flow of the SCE is ECC protected. Thus, an I/O Store data entering the SCE from the I/O interface passes through the Parity-to-ECC Converter (205) while I/O fetch data leaving the SCE passes through the ECC-to-Parity Converter (219). In both cases parity and ECC checks are performed respectively and errors are reported to the appropriate controller. Also, unlike the CP operations which utilize separate buffers for fetches and stores, I/O operations employ a common set of I/O Interface Buffers (206) to process both fetches and stores. I/O Fetches that hit in the cache result in the data passing through ECC Station (214) and being written into I/O Interface Buffer (206). Data that misses the L2 Cache (204) may come from the local main memory. In this case, it is accessed using the same data path as CP Fetch Misses. Once the data is written into the Memory Fetch Buffer (203), our invention employs a buffer-to-buffer data transfer to move the data from the Memory Fetch Buffer (203) to the I/O Interface Buffer (206).

As mentioned earlier, I/O Stores are not architecturally mandated to hit in the cache, therefore data paths must exist to transfer the data to the cache or the main memory. I/O Stores that hit the cache employ another buffer-to-buffer transfer to move the incoming I/O Adapter data from the I/O Interface Buffer (206) to the I/O Interleave Buffer (207). Once the cache is available, the data is written. Once again, SPUE Injection logic (215) is used to replace the data with the SPUE pattern of zero data and '40'x check bits if UEs were detected in the Parity-to-ECC Converter (205). For I/O Stores that must be transferred to the local main memory, the data is moved from the I/O Interface Buffer (206) to the Memory Store Buffer (208) using a third buffer-to-buffer transfer. From here the data is eventually transferred to the main memory interface, just as it was for the LRU Cast Out sequence of a CP Fetch Miss. As in the case of ECC Station (214) detecting a UE, if UEs were detected in the Parity-to-ECC Converter (205), it results in a SPUE pattern being infused into the outbound data by SPUE Injection logic (209).

The preferred embodiment also employs a system structure involving multiple nodes or clusters of Central Processors and I/O Adapters. This means requests can be initiated from a remote node. In the case of remote fetch requests, our invention provides for a Remote Fetch ILV Buffer (210) and a Remote Fetch Memory Buffer (220) to handle fetches that hit and miss the L2 Cache (204) respectively. In the case of remote fetch hits, the data passes through ECC Station (214) whereas remote fetch data acquired from the main memory passes through ECC Station (213). In either case, data is transferred to the Ring Interface once the ring data path is available. During that transfer, if a UE was detected by either ECC Station (213 or 214), it activates the Zero Data logic (211). Our invention employs this logic to transform uncorrectable data patterns into good data patterns by replacing the original data and ECC check bits with zero data and proper check bits. Additionally, the data is "tagged" as UE data on the Ring Interface. By replacing the bad data with good data, the present invention improves fault isolation in a multi-nodal system structure by preventing propagation of the UE to a downstream ECC Station on a receiving node. In this manner, the UE is only detected and logged on the node where the error actually occurred instead of being detected on every node the data traverses.

In the case of stores initiated from remote I/O Adapters, these data transfers are received into the node by the Ring Store Buffer (201). This data passes through ECC Station (200). If the line hits in the local L2 Cache (204), then the data is moved via a buffer-to-buffer transfer to the Ring Store Interleave Buffer (202) where it is eventually written into the cache. If a UE was detected by ECC Station (200), then the SPUE Injection logic (215) overwrites the data with zero data and a '40'x ECC check bit pattern. However, if the I/O Store data misses the cache and targets the local main memory, then the data is transferred from the Remote Store Buffer (201) to the Main Memory interface. Once again, any UEs detected by ECC Station (200) result in a SPUE being injected on the outbound data, but this time SPUE Injection station (209) performs the task.

The present embodiment also contemplates an additional Ring Buffer which is noted in the lower right portion of FIG. 2. This Ring Flow-Thru Buffer (221) exists for the sole purpose of passing data through a node, if it targets a downstream node. The incoming data is checked by ECC Station (200) prior to being written into the Ring Flow-Thru Buffer (221). Upon being read out of the buffer for transfer onto the Ring Interface, any UEs detected by ECC Station (200) are used to drive the interface tags and force good outbound data, all of which will be described in more detail.

Now that FIG. 2 has been described in detail it should be understood by one skilled in the art that the preferred embodiment comprises a sophisticated data flow with numerous combinations of sources and sinks. Furthermore, operations often require multiple data transfers in which data must temporarily reside in buffers until downstream resources are available to continue the transfer. With the numerous ECC and Parity Checking stations, a means must be employed to accept the UE signals from these stations, and manage the UE status alongside the data. Prior art demonstrates that a common solution is for the ECC Station to be combined with Special UE Injection logic such as SPUE Injection Station (215) such that any UEs detected result in an immediate transformation of the original data into a special recognizable data pattern. This solution has been effectively used in many systems including predecessors to the Z-Series Enterprise Servers. However, as the frequency and performance demands of large systems continue to grow, it is no longer feasible to inject these SPUE patterns in-line. The present invention solves this problem by portraying a system of UE tags and interface protocols which allow the data path to remain free of frequency impeding pattern injections.

Figure 3:
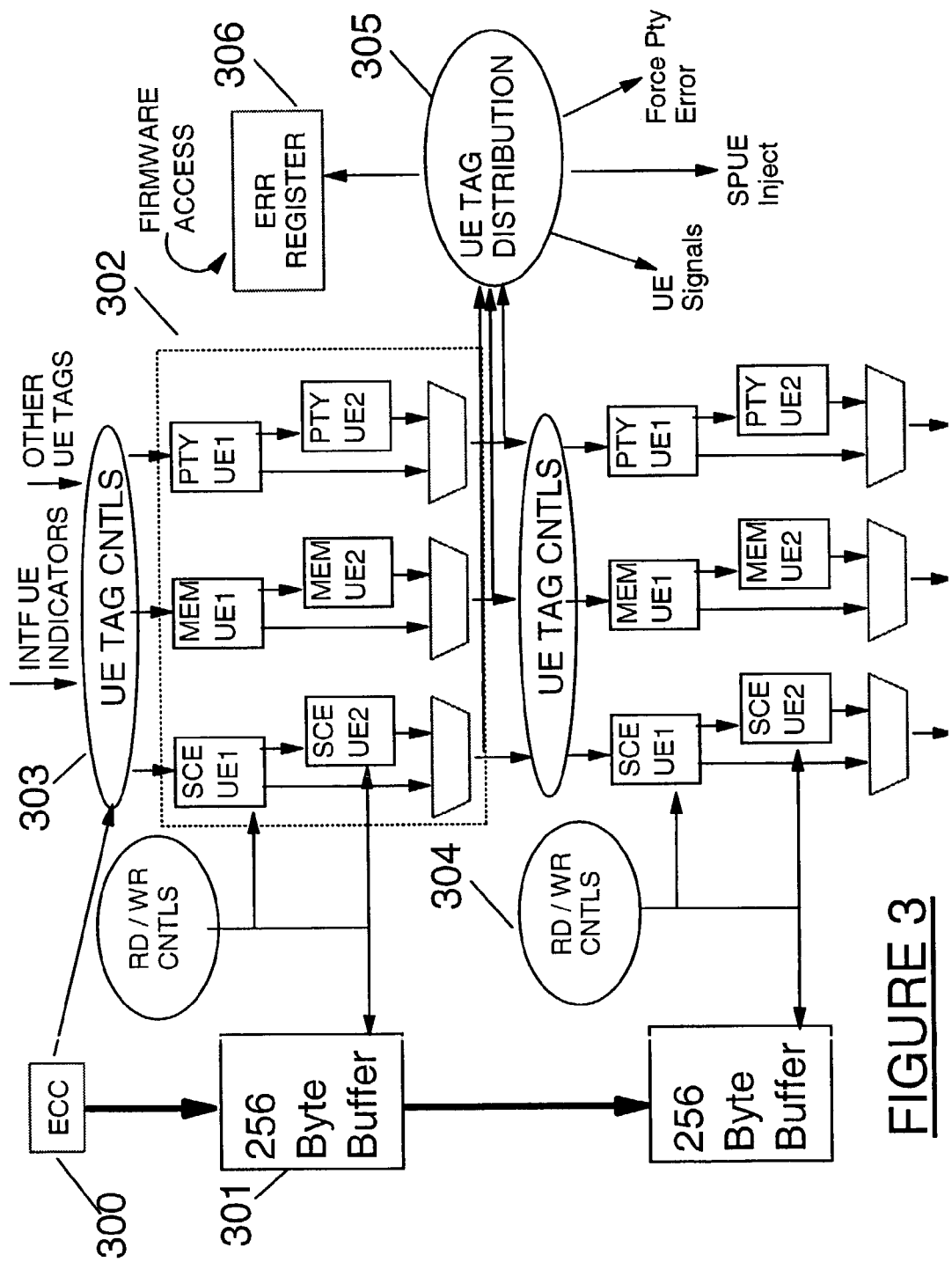
FIG. 3 shows the uniform UE tagging scheme used to track and report errors.

One notable aspect of the present invention is the use of a uniform paradigm for receiving, tracking and reporting UE status for the plurality of errors that can exist within the preferred embodiment system structure. As shown in FIG. 3, a representative ECC Station (300) checks incoming data, reports and corrects single bit errors, and reports any uncorrectable errors (UEs) to the UE Tag Controls (303). This ECC station could be any of those found within the data flow depicted in FIG. 2. FIG. 3 illustrates a typical segment of the many data paths in FIG. 2 whereby data is written into a temporary buffer upon passing through the ECC Station (300). In the preferred embodiment these 256 Byte Butters (301) are the most prevalent, but one skilled in the art would appreciate the size of these buffers is inconsequential to the present invention.

In addition to the UE signals emanating from ECC Station (300), the UE Tag Controls (303) may also accept interface UE indicators and the outputs of upstream UE tags. It's this UE tag distribution network provided in the preferred embodiment which enables the present invention to effectively manage the multitude of errors that can exist in such a complex data flow. The UE Tag Controls collect the various types of UE indicators into a series of UE Tag Latches (302). The preferred embodiment uses three pairs of tag latches to serve each buffer (301) in the data flow. One pair of tags represents any kind of SCE UE. These are uncorrectable errors detected by the ECC Stations within the SCE data flow. They implicate defects in the SCE hardware, or transmissions errors on the various interfaces. The second pair of tags represents a memory or main storage UE. These are uncorrectable errors resulting from a defect in the memory cards or DRAMs. The last pair of tags serve as parity protection across the SCE and Memory UE tags. Because the distribution of the UE tags throughout the system structure is such a vital aspect of the proposed method, our invention further improves overall system reliability by ensuring the entire UE tag distribution network is parity protected in order that receivers of said UE tag information can discern whether the information is reliable to act on.

Another notable feature of the present invention is the use of pairs of tags to provide accurate status for data buffers. Performance is paramount in the preferred embodiment, thus it is often desirable to "pipe line" data through the buffer. In other words, the buffer controllers are designed to begin loading a second line of data into the buffer as soon as the read access for the first line commences. Since these buffers hold data for a plurality of requesters, it's imperative to maintain accurate UE status for both lines of data. Our invention employs a novel technique of transferring the UE tag status from the first set of tag latches to a second set if the Buffer Read/Write Controls (304) detect that the data is pipe lining through the buffer.

FIG. 3 also exemplifies the buffer-to-buffer transfers depicted in various parts of the SCE data flow in FIG. 2. As shown in FIG. 3, as the data is moved from one 256 Byte Buffer (301) to another buffer, our invention also provides a means to transfer the UE Tags (302) from the one set associated with the first buffer to a second set associated with the target buffer. Additionally, the outputs of the UE Tags (302) also feed the UE Tag Distribution logic (305) located within various interface controllers throughout the SCE data flow. It's this logic that drives the Interface UE indicators or logic such as the SPUE Injection Stations, the Zero Data Injection or the Bad Parity Injection stations shown in FIG. 2. Finally, the outputs of the UE Tags (302) also feed an Error Reporting Register (306) in the preferred embodiment. The present invention employs a novel ERR which permits firmware access to enable the Central Processor's millicode to access the contents of the ERR during normal system operation. This enables a software driven method to access the UE tag status, determine which types of errors are present (SCE or main storage), isolate their origin, and take the appropriate recovery action such as varying main storage off-line. All of this can occur while customer applications are still running thereby providing continuous availability.

It should be noted that the UE Tags (302) depicted in FIG. 3 are line-based. In other words, the preferred embodiment only keeps track of the UE status for each line (256 bytes) of data being transferred throughout the SCE. This is because the cache organization of the preferred embodiment is based on a 256 byte line size and all recovery actions are line-based as well. In other words there's no benefit to tracking UEs for each word within a line since the resulting recovery action would be performed for the entire line anyway. However, other system architectures may require UE tracking to a finer granularity. One skilled in the art can appreciate how the UE Tags (302) of the present invention can easily be expanded to provide three pairs of tags for any number of entries in the buffer (including each and every entry if so desired).

On a related note, the preferred embodiment only tracks two types of errors (memory and SCE UEs). This, too, is a function of the recovery actions contained within the system structure of the preferred embodiment. Certainly other systems may employ additional recovery methods thus requiring more types of errors to be monitored. Again, one skilled in the art can appreciate how the UE Tags (302) in the present invention can be expanded to manage a third, fourth, fifth or any number of additional types of errors.

Finally, the last aspect to note in FIG. 3, is the absence of any holding registers for data transfers. The present invention employs the same UE Tag infrastructure for holding registers, such as the CP Sense Register (212) shown in FIG. 2. The only difference is holding registers don't require pairs of UE Tag latches since the data can't be pipe lined. For holding registers, our invention utilizes only three latches, an SCE UE, Memory UE and parity tag latches.

Figure 4:
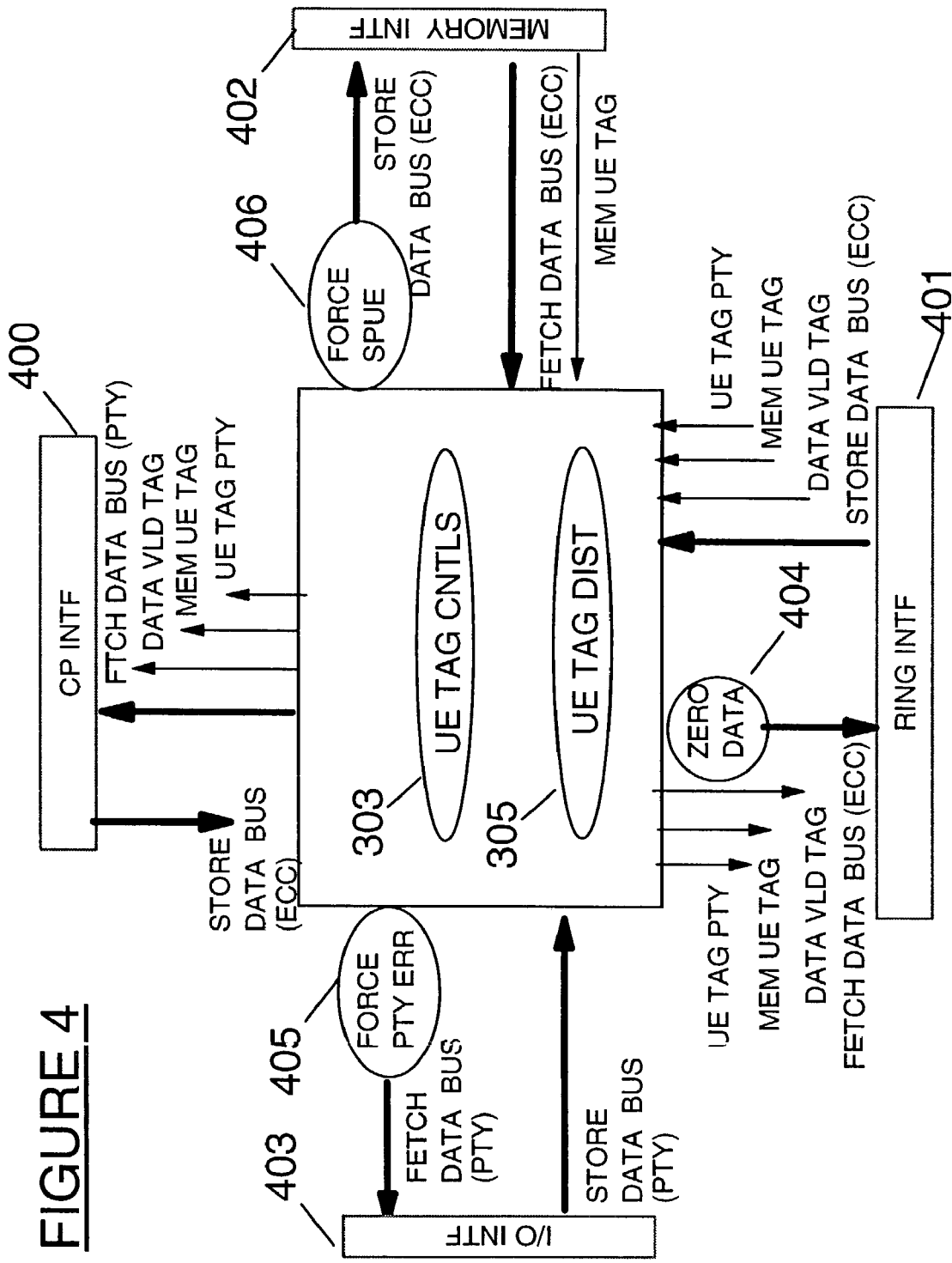
FIG. 4 illustrates how a the uniform paradigm of the present invention interacts with various types of interface protocols.

FIG. 4 of the preferred embodiment depicts the various interfaces with which the present invention interacts. As illustrated in the diagram, the uniform UE tag paradigm disclosed in FIG. 3 is represented by the UE Tag Controls (303) and UE Tag Distribution logic (305). These act in concert to receive incoming UE status from the various interfaces, and distribute the UE Tag latch outputs either to the interface directly or to interface logic to perform data alterations.

Turning attention to the CP Interface (400) in FIG. 4, it can be seen that CP Store data is ECC protected and the data bus is not accompanied by any UE status signals. However, the CP Fetch data in the preferred embodiment is parity protected, thus the data bus is accompanied by a Data Valid tag, a Memory UE tag and a parity bit protecting both tags. The Memory UE tag is positively active if the corresponding data transfer is erroneous due to a main storage UE. The Data Valid tag is normally positively active when the data is error-free. Thus, the absence of a Data Valid tag indicates an SCE UE. In the preferred embodiment, the Central Processor takes different recovery actions depending on which tag is active. In the case of the Memory UE, the processor will inform the operating system to take the corresponding memory page off line. If the Data Valid tag is absent during the data transfer, this indicates some type of SCE error. The processor attempts to retry the data fetch and if the subsequent fetch fails, the processor goes off line. Our invention manages and reports different types or UEs which affords the Central Processor the opportunity to take an appropriate recovery action to maximize system availability The bottom of FIG. 4 depicts the Ring Interface (401) which is very similar to the CP Interface (400). The Ring Interface also comprises a Data Valid, Memory UE and parity protection tag which accompanies the data bus. Unlike the CP Interface, the Ring Interface conveys this trio of UE tag signals for both fetch and store operations. Another difference is the inclusion of the Zero Data logic (404) which is used to replace errant data with zeros and correct ECC check bits whenever the outbound data is tagged with any type of UE. This important aspect of the present invention improves fault isolation. Had the errant data been allowed to leave the node, then the ECC Station on the receiving node would detect and report the same UE. By the time firmware or software can intercede and access the UE reports, it may not be able to discern the true source of the error. Instead, the present invention relies exclusively on the UE Tag indicators to signify the validity of the data rather than relying on the data pattern itself.

On the right side of FIG. 4, the Main Memory Interface (402) is depicted. This interface is less proprietary and more representative of an industry standard interface. For example, the store data bus is ECC protected but does not have any separate UE tag signals. However, the fetch data bus does include a single Memory UE Tag signal. The Memory UE Tag is positively active whenever a memory UE is detected on data leaving the memory card. For data being stored to memory, SPUE Injection logic (406) is used to replace the outbound data pattern with zero data and special check bit patterns. A pattern of '40'x is used to indicate an SCE UE whereas a pattern of '01'x is used for a Memory UE.

It should be noted that in the preferred embodiment, it is possible for a Memory UE to be returned as memory store data. This can happen during a memory page move operation in which a line of data is fetched from one memory location and temporarily loaded into the Memory Store Buffer (208). A subsequent memory store operation is initiated to a different memory location. If the fetch data contains a Memory UE, the Memory Store Buffer controller sets its Memory UE Tag latch, then distributes it to the SPUE Injection logic (406) during the memory store transfer. This results in a '01'x ECC code inserted into the check bits.

Although the CP and Ring Interfaces are more beneficial in regards to flexibility and performance, one notable aspect of FIG. 4 is the ability for our UE tagging method to adapt to any type of interface even one that only affords partial UE tag communication. The opposite extreme to the CP and Ring Interface is shown on the left side of FIG. 4 with the I/O Interface (403). In the system structure of the preferred embodiment, this interface is very representative of an industry standard interface in that it provides no separate UE signaling at all. There are only data busses in both directions, and the data busses are parity protected. Our invention interfaces with such a protocol in two ways.

First, I/O Store data that enters into the SCE is parity checked and converted to ECC. If a parity error is detected, it is treated as a UE and an SCE UE tag latch is set. The I/O Store controller uses this information to inhibit the store from progressing further and responds back to the I/O Adapter that the store was unsuccessful. In the case of I/O fetches, if a UE occurs during the data transfer, the UE Distribution logic (305) instructs the Force Parity Error logic (405) to replace the errant data with zero data and bad parity. This signals the I/O Adapter that the fetch was unsuccessful, and the I/O Adapter can invoke a recovery action such as retrying the fetch.

As one can see from FIG. 4, three different means of communicating the UE Tag information across the interfaces are demonstrated. One skilled in the art can appreciate how the growing use of common components and intellectual property driven by industry standards makes it difficult to achieve homogenous protocols at every port. In a complex data flow such as the SCE, communication must take place with several kinds of requesters.

In the preferred embodiment, the CP and Ring interfaces are optimized for communicating with the underlying UE Tag scheme. However, the description of FIG. 4 demonstrates how the present invention employs a single unified UE Tag management scheme and adapts it to whatever interface is present at the port. Since the management scheme is the cornerstone of the subsequent recovery, it is imperative to employ a uniform method throughout the data, regardless of the type of data being transferred within said data flow.

Another notable feature of the preferred embodiment is the exploitation of a word-sliced data flow to improve the recoverability of uncorrectable errors in main storage. As mentioned earlier in the discussion regarding FIG. 4, the preferred embodiment utilizes separate indicators between the SCE and Central Processors to differentiate between SCE and Memory UEs. These two signals are further parity protected by a third signal such that the processor can ascertain the validity of both UE signals. The shortcoming of such an interface is in the event of a parity error, the processor has no recourse other than to assume the worst case and invoke recovery actions commensurate with simultaneous SCE and Memory UEs. Our invention seeks to improve upon this situation by providing redundant copies of the Memory UE signals to assist the processor in ascertaining the true validity of the UE indicators.

Figure 5:
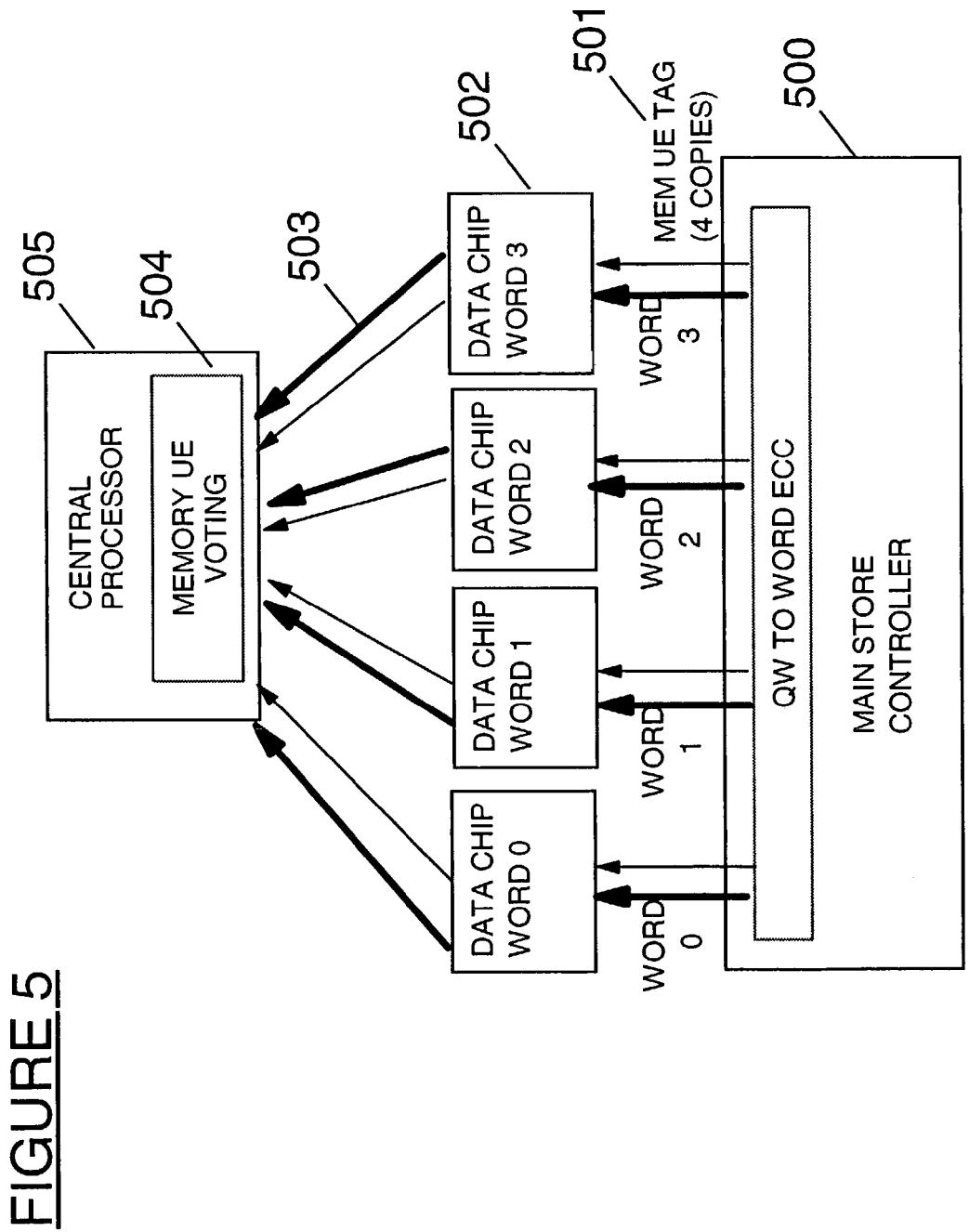
FIG. 5 depicts the redundancy aspect of the main memory storage UE indicators.

FIG. 5 depicts a high level view of the data flow between the Main Store Controller, the SCD Data Flow chips and one particular Central Processor. The Main Store Controller (500) is responsible for interacting with the main memory DRAMs to fetch and store the required bytes of data. Because of the physical organization of the DRAMs, the Main Store Controller (500) handles an entire quadword (128 bits) of data at a time, and utilizes a special quadword (QW) Error Correction Code to protect all 128 bits. Prior to shipping the data to the SCD Data Chips (502), the Main Store Controller must slice the data into 32-bit words to accommodate the word sliced data flow of the preferred embodiment. Thus, each interface (501) between the Main Store Controller (500) and each Data Flow chip (502) consists of a word of data protected by 7 bits of word based ECC and a single Memory UE indicator. Since a Memory UE pertains to any number of bits in the entire quadword (QW), the Main Store Controller simply replicates the Memory UE signal to each of the four Data Flow chips (502). Therefore, the Main Store Controller will activate all four copies of the Memory UE indicator anytime a QW contains a main store UE.

As part of the UE Tag Controls (303) and UE Tag Distribution (305), any incoming Memory UEs are forwarded to the Central Processors (505) along with the data words on the aforementioned CP Interface (503). This interface consists of the four 32 bit data words, whereby each word is parity protected and the associated Data Valid, Memory UE and parity indicators. The primary difference between the Data Valid and Memory UE indicators of the CP Interface (503) is that the Memory UEs originate from the Main Store Controller and are forwarded through the Data Flow chips (502) to the Central Processor (505). Since the four SCD Data Flow chips (502) act in concert, all four copies of the Memory UE indicators will normally be active for any Memory UE. A missing Data Valid indicator, on the other hand, signifies an SCE UE. These tend to occur only within a single SCD Data Flow chip, therefore only one of the four data valid signals would likely be absent.

We have enabled capitalization on the redundant Memory UE tags by employing a Memory UE Voting mechanism (504) residing in each Central Processor (505). In this manner, the mechanism examines the four copies of the Memory UE indicators. If three or more are active, then the processor can reliably invoke the proper recovery action to take the failing memory off line. This examination can be done in conjunction with the parity check of the UE indicators to isolate the exact type of failure. Consider the example in which a "good" QW is being transferred. None of the Memory UE indicators should be active. However, if one of the four Memory UE signals erroneously activates, this induces a parity error in the Data Valid and Memory UE grouping to which the erroneous signal belongs. Without the feature of the present invention, the processor would not be able to discern whether the parity error indicates an erroneous Data Valid or Memory UE indicator. However, with the present invention, the Memory UE Voting logic (504) will detect an erroneous Memory UE indicator and thus can work in conjunction with the parity detection logic to determine that the real problem is not an actual main memory failure but a failing Memory UE indicator between the SCE and CP. The ability to properly isolate the problem prevents unnecessary memory recovery actions and allows for proper parts replacement in the field. Additionally, the redundant Memory UE tags permits the system to continue running until the field repair can be made since the present inventions provides a means for the processor to differentiate real UE problems from erroneous indications.

Figure 6A:
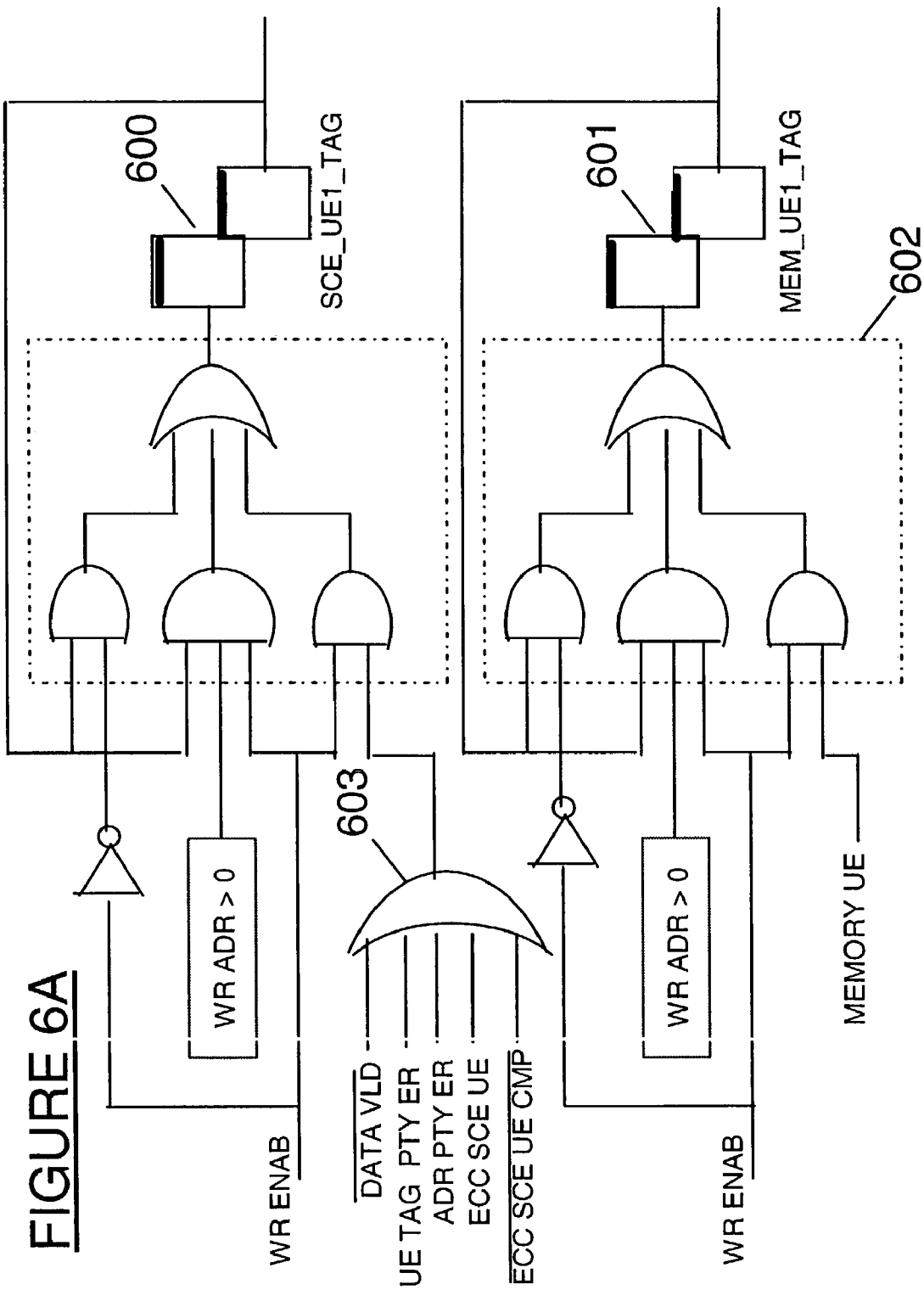
FIGS. 6A thru 6C illustrates the internal logic which comprise the UE tag mechanism.

The three parts of FIG. 6 describe the internal workings of the UE Tag logic. As mentioned earlier, the preferred embodiment uses two type of UE Tags to discern between SCE and Memory UEs. In addition, FIG. 6 focuses on the implementation for tracking UE status for data in a line buffer. Beginning with FIG. 6A, the logic is described for setting and resetting the primary UE Tag latches. These primary latches are denoted with _UE1_ in their names. The diagram shows the primary SCE UE Tag latch (600) and the primary Memory UE Tag latch (601). Both latches are fed by identical AND/OR circuits which perform the Set/Reset/Hold function (602). The Set/Reset/Hold function of the present invention is generic and can be applied to any type of UE Tag latch. Thus, one skilled in the art can appreciated how alternate embodiments may comprise additional types of UE Tags and the Set/Reset/Hold function (602) is simply replicated as needed.

The Set/Reset/Hold function (602) is comprised of the three conditions which are OR'd together to drive the latch. The first condition is the hold condition and is represented by the topmost AND gate. The hold condition is what preserves the state of the latch when the buffer is not being written. In other words if the buffer is being read or simply in an idle state, then output of the UE Tag latch is fed back through the AND/OR structure and into the latch input. Whenever, the buffer is not being written, the WR ENAB signal is low thereby passing through the inverter in FIG. 6A and activating the topmost AND gate.

Whenever the WR ENAB is active (signifying a buffer write operation is in progress), then the topmost AND gate is disabled and the middle and lower AND gates become active. The middle AND gate represents the Reset portion of the Set/Reset/Hold function (602). Its purpose is to reset the tag latch upon initiation of a new write operation. In the preferred embodiment, all new write operations commence with WR ADR zero. Hence when WR ENAB is activated and WR ADR equals zero, this forces a zero to be output from the middle AND gate. If no UE is associated with the data being written into address zero of the buffer, then the zero from the middle AND gate will be written into the UE Tag latch, thus resetting the UE Tag status. Once the WR ADR increments above zero, then the middle AND gate serves as the hold condition for the remainder of the write operation, thereby feeding back the output of the UE Tag latch. As mentioned above, once the write operation ceases, the topmost AND gate takes over as the hold condition for the latch.

The third component of the Set/Reset/Hold function (602) is the lower AND gate responsible for setting the latch to indicate any incoming UE status. This lower gate is activated when WR ENAB is active regardless of the address being written. This ensures that any incoming UE automatically triggers a setting of the latch regardless of the output of the middle AND gate. In this way, the function is "set dominant" which provides a means for capturing a UE associated with any word being written into the buffer. Besides the WR ENAB input, the-other input to the lower AND gate is the collection of all possible UE indicators which activate this particular UE Tag. For example, in FIG. 6A the only potential indicator for the Memory UE Tag (601) is the Memory UE indicator received from an interface such as the Ring Interface (401) or Memory Interface (402) described in FIG. 4. However, because the purpose of the SCE UE Tag (600) is to represent a plurality of failures that can occur within the SCE, the input to its lower AND gate is the OR (603) of a multitude of error indicators. These range from a missing Data Valid indicator, such as that coming from the Ring Interface (401), to a UE indicator from a local ECC Station, to various types of parity errors. These parity errors include parity checks on the buffer address registers, the UE indicators received from the local ECC Stations, and even the UE Tag latches themselves. Our invention provides increased reliability by providing for parity protection and detection across all facets of the UE distribution system.

Figure 6B:
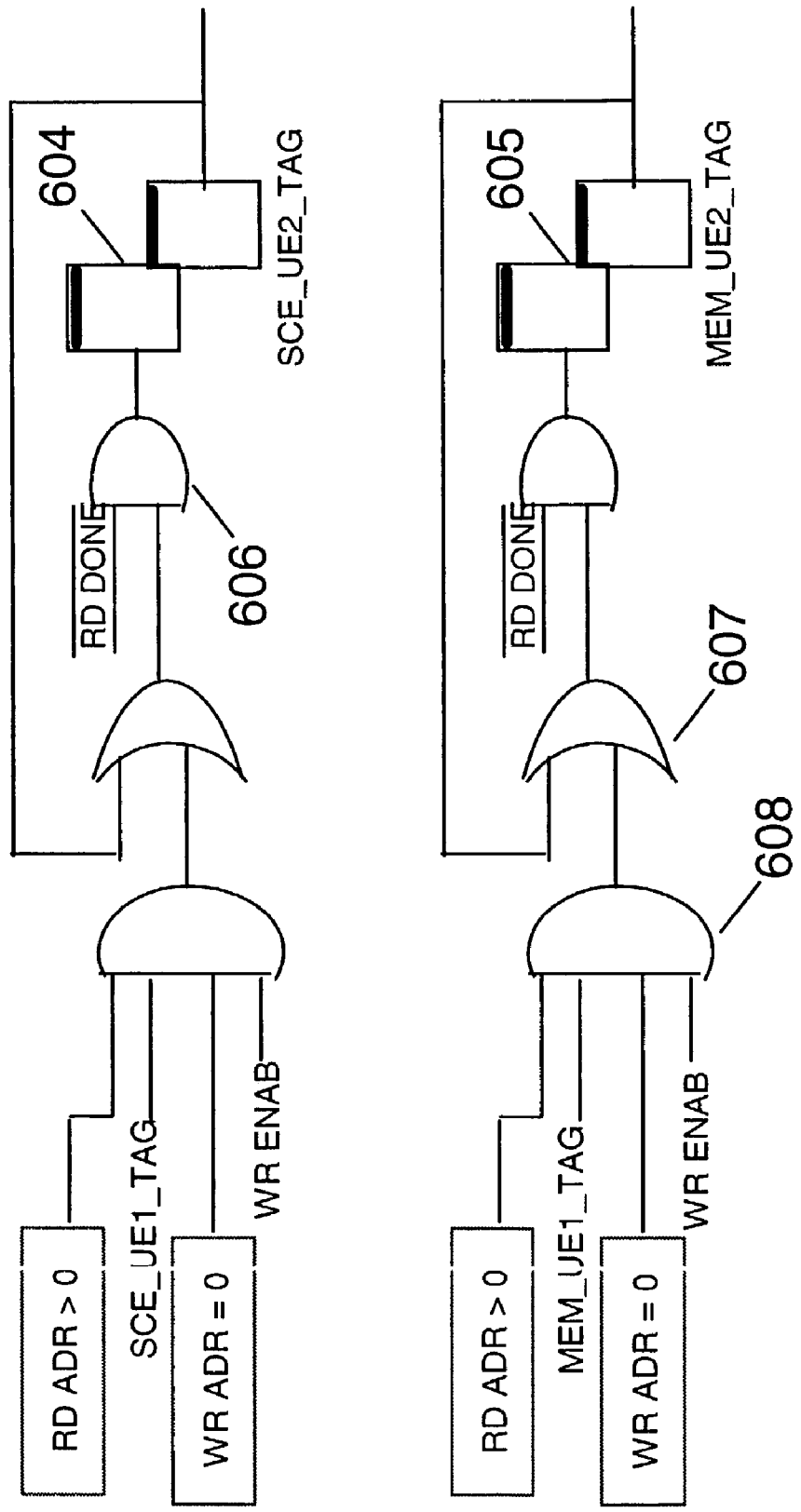

FIG. 6B focuses on the secondary UE Tag latches which the present invention utilizes to retain accurate UE Tag status for a first set of data being read out of a buffer while a second set of data is being simultaneously written into the same buffer. In high performance systems such as the preferred embodiment, it's imperative to allow this pipe lining of data through the buffer, and since the two sets of data will frequently target different destinations, a means must exist to accurately track the status of both sets of data. In FIG. 6B, secondary UE Tags (denoted by _UE2_ in the latch names) exist for both types of tags in the preferred embodiment. The secondary SCE UE Tag (604) and Memory UE Tag (605) are both fed by identical logic which controls their setting, resetting and holding. The Reset gate (606) is an AND gate controlled by a RD DONE signal which is generated by the buffer controller. This signal is active whenever a read operation for the buffer completes. It remains active until a new read operation initiates. The activation of this signal serves as a reset of the secondary UE Tag latches. Once the read operation completes, these tag latches are no longer needed as the primary tag latches can resume responsibility for tracking any new UE status.

The secondary UE Tag latches come into play when a buffer read operation commences. It's in this window when the potential exists for a second set of data to begin writing into the buffer while the first set of data is being read out. Therefore, it's during this time that the secondary UE tags must maintain accurate UE status regarding the first set of data. Hence, when RD DONE is low, the Reset AND gate (606) allows for the secondary UE Tag latches to be set by the output of the OR gate (607). The OR gate (607) provides for either the setting of the secondary UE Tag latch from the output of AND gate (608) or the holding of the latch by providing a feedback path from the output of the latch. The purpose of AND gate (608) is to pass the output of the primary UE Tag latch (600 or 601) to the input of the corresponding secondary UE Tag latch (604 or 605) when the conditions are right. The proper conditions for this UE Tag transfer are indicated by the inputs to AND gate (608) which show that the WR ENAB must be active and WR ADR must be zero. Hence a new write operation must be commencing to buffer address zero. Additionally, the read operation must be past address zero as indicated by RD ADR>0. The preferred embodiment does not permit the read and write operations to occur simultaneously to the same address thus, by definition, a pipe lining operation begins when the read address has incremented past address zero and the write initiates at address zero. Once these conditions are met, OR gate (607) will simultaneously hold the latch at its present value as well as allow any new status updates from the primary UE Tag latches to be transferred into secondary tag latches.

Figure 6C:
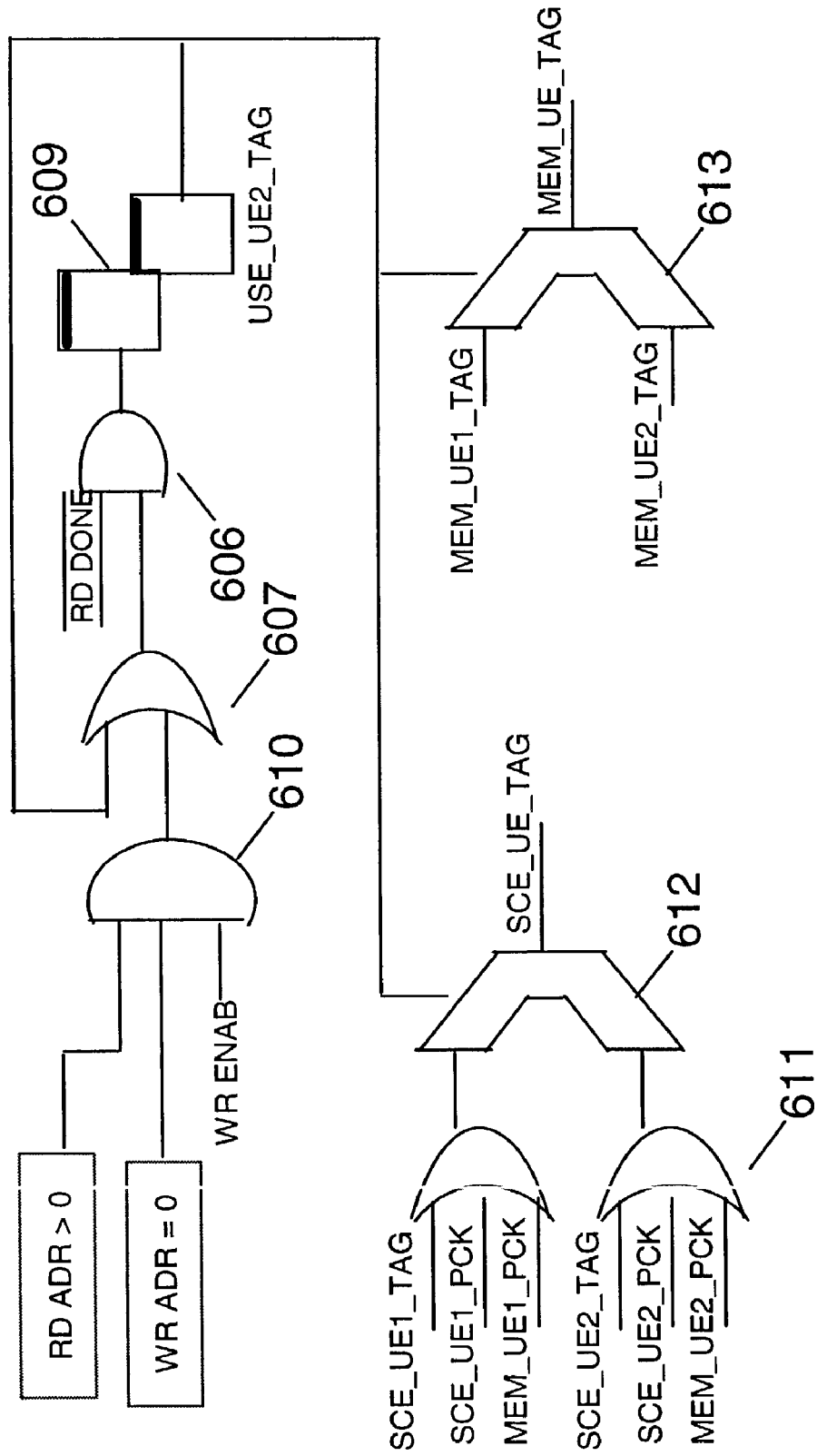

Since the primary motivation for having UE Tag latches is to distribute the status to downstream recipients, a means must exist to outgate the appropriate UE Tag latch to the recipients. FIG. 6C illustrates the UE Tag outgate logic. The primary component in this logic is the USE_UE2_TAG latch (609) which controls the outgate muxes. One mux exists for each type of UE Tag latch. The SCE UE Tag outgate mux (612) will outgate the secondary tags if USE_UE2_TAG is active, otherwise it will default to out gating the primary tags. One will notice the inputs to the SCE UE Tag outgate mux (612) is more than the UE Tag latches themselves. OR gates (611) allow for either the outputs of the UE Tag latches or any corresponding parity checks to be fed into the outgate mux. This is important feature in the present invention as it provides absolute accuracy of the UE Status reporting by permitting an asynchronous event such as a parity check on the UE Tag latches themselves to immediately override any "good" status being out gated from the UE Tag latch. Otherwise, if the parity check had to first ingate into the SCE UE Tag latch, it would result in at least one cycle of data transfer in which the recipient would falsely believe the data is "good" when, in fact, the UE Status corresponding to the data transfer is questionable due to the,parity check. Hence, our invention ensures any UE Tag latch parity check is immediately forwarded to the appropriate mux for potential distribution with the data.

Returning to FIG. 6C, there also exists a Memory UE Tag outgate mux (613), but unlike the SCE UE Tag outgate mux, this mux only needs to outgate the outputs of the Memory UE Tag latches. Once again, this is because the preferred embodiment treats all parity checks within the SCE as SCE UEs and confines Memory UEs strictly to uncorrectable errors in main storage. When the USE_UE2_TAG is active, then the output of the secondary Memory UE Tag (605) will be out gated, otherwise the output of the primary Memory UE Tag (604) will be out gated. The USE_UE2_TAG latch is driven by similar logic to the secondary UE Tags from FIG. 6B. It consists of the same Reset function (606) based on the value of the RD DONE signal. Essentially the USE_UE2_TAG is reset in the same manner as the secondary UE Tag latches. Additionally, the OR gate (607) is used to feedback the output of the latch for purposes of holding its value, or to allow it to be set by the output of setting AND gate (610). The setting AND gate (610) will activate the USE_UE2_TAG latch whenever a write operation commences to WR ADR zero, and a read operation is in progress to an address other than zero. Once again, this indicates buffer pipe lining is in progress and thus the secondary UE tags must take over reporting the UE Tag status to the downstream UE Tag distribution logic (305).

It should be noted that all components shown in FIGS. 6A thru 6C are necessary to support UE Tag management for buffers. In the case of holding registers such as the CP Sense Register (212), there is no need for primary and secondary tags or the out gating logic to support distribution of the proper latch output. Hence one skilled in the art would appreciate how only the logic in FIG. 6A would be required to support the UE Tag latches for a holding register.

When errors are detected and managed using the UE Tag latches, it is often necessary, using hardware or code, to analyze the errors. This analysis can be to determine what recovery action to take to eliminate future errors (like deleting a line position in a cache, sparing out a memory chip, resetting a portion of logic, etc.). It is also important to log the error conditions to allow for isolation of defects to a given component so a spare component can be ordered for the machine.

Figure 7:
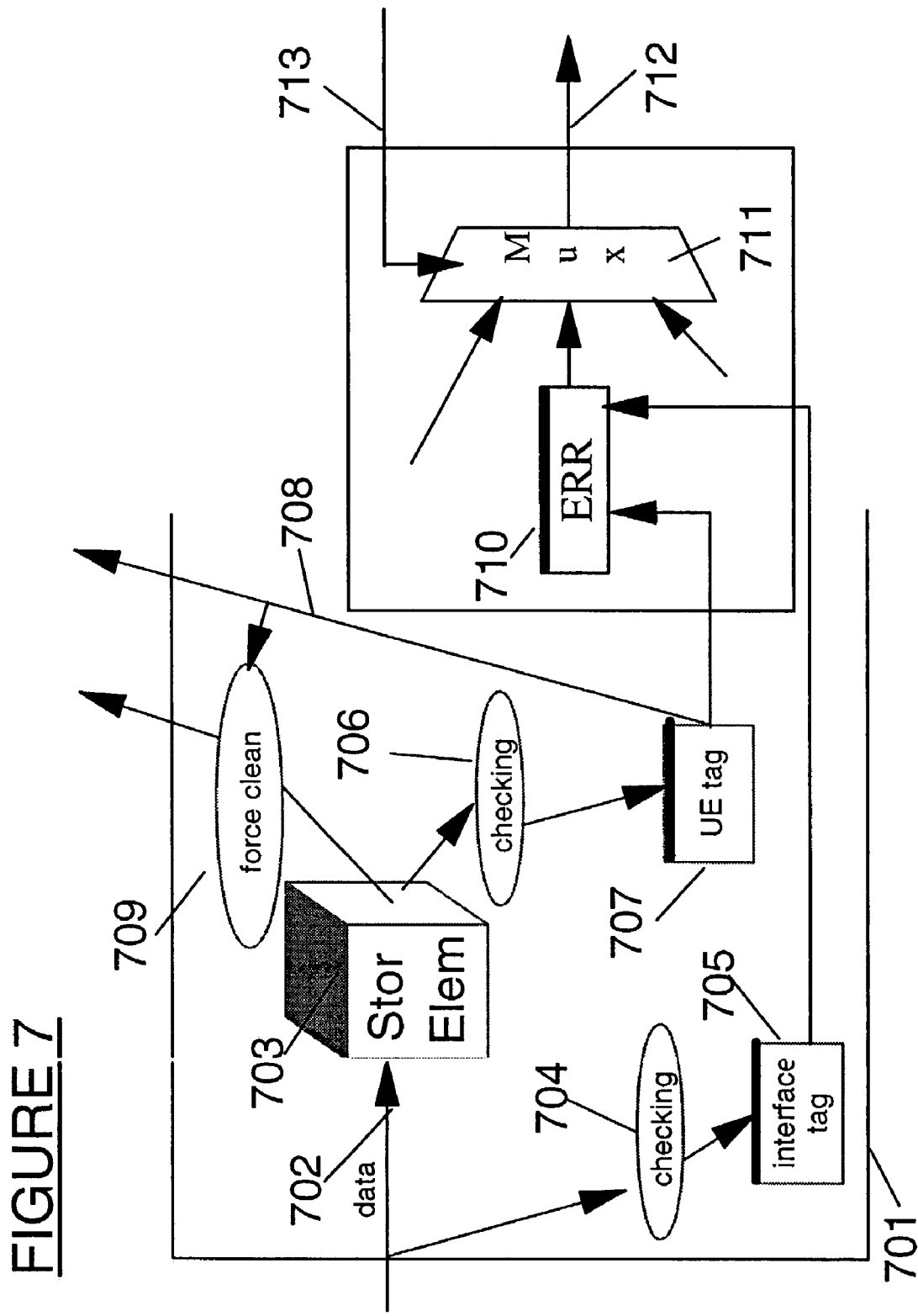
FIG. 7 depicts the error reporting logic for UE tag logout and analysis as well as interface support logic to help isolate failures.

Turning to FIG. 7, shown is a generic component (701) that receives a data bus (702) from another component, is checked using checking logic (704) and sets appropriate interface UE tags (705). The data is distributed on the chip and may enter a storage element(703) such as a line buffer or cache. When data exits said storage element (703), it is checked using checking logic (706) and sets appropriate UE tags (707). When the cache data gets sent to another component, the UE tags (707) are checked for errors. If errors are present, the UE tag signals (708) are transferred to the next component and the data is forced clean (good ECC or parity) by force clean logic (709). This process of forcing good data patterns helps to eliminate checkers from coming up on other components, which would make it more difficult to isolate the errors. FIG. 7 represents the general premise of the present invention which has heretofore been described in detail. One skilled in the art will appreciate how the generic elements depicted in FIG. 7 correspond to specific elements disclosed throughout FIGS. 2 through 6. The interface UE tags (705), storage element UE tags (707), and other UE tags are sent into various bits of the Error Reporting Register, ERR, (710). The ERR (710) can be selected onto the logging data bus (712) using logging mux (711) by supplying ERR logging address on logging address bus (713). The information can then be routed to a service element, processor, or disk and analyzed by external code to determine which UE tags came up.

If a UE tag came up for an interface, the driving and receiving components may be scheduled for replacement. Also, the interface may be degraded to avoid future use or can be reconfigured to alleviate the errors coming up. Likewise, if a UE tag came up for a cache failure, a line delete may be scheduled or an array redundancy fuse may be blown in the future. Other UE tag information may lead to various other recovery or replacement operations.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for protecting the data in a symmetric multiprocessing (SMP) computer system, comprising the steps of:
   (a) detecting errors in said data in a dataflow of said computer system and determining and indicating a data error type for each of the detected errors as one of a plurality of data error types;
   (b) managing error status of said detected errors and distinguishing each one of said plurality of data types on a status bus as an error status associated with specific data of said computer system, wherein the said step of managing error status allows for concurrent pipelining of multiple packets of data through a shared resource while maintaining proper error status for each packet; and
   (c) in the process of managing error status of said detected errors merging new data error type errors with existing error status; and then
   (d) distributing error status with said data to propagate each one of said plurality of different data type errors though said dataflow of said system as separate identified data error types identified with said specific data having a detected error identified in said computer system data.

2. The method for protecting the data in a symmetric multiprocessing (SMP) computer according to claim 1, wherein said managing of error status is accomplished through a plurality of storage elements.

3. The method for protecting the data in a symmetric multiprocessing (SMP) computer according to claim 1, wherein said error status comprises a plurality of data error types.

4. The method for protecting the data in a Symmetric multiprocessing (SMP) computer according to claim 3, wherein said data error types include memory errors and non-memory errors, including cache errors, interface errors, control errors and address errors.

5. The method for protecting the data in a symmetric multiprocessing (SMP) computer according to claim 1, wherein said error status is protected comprising the steps of:
   (a) protecting error status;
   (b) detecting status errors in the said error status; and
   (c) merging new status errors with existing error status.

6. The method for protecting the data in a symmetric multiprocessing (SMP) computer according to claim 1, wherein said distributing error status includes error status protection.

7. The method for protecting the data in a symmetric multiprocessing (SMP) computer according to claim 1, wherein said distributing error status is done independently of the data distribution.

8. The method for protecting the data in a symmetric multiprocessing (SMP) computer according to claim 1, wherein said distributing error status is done by injecting special UE codes within an ECC-protected data codeword.

9. The method for protecting the data in a symmetric multiprocessing (SMP) computer according to claim 1, wherein said distributing error status is done by injecting bad parity within a parity-protected data codeword.

10. The method for protecting the data in a symmetric multiprocessing (SMP) computer according to claim 1, wherein said data is protected with error status protection by one or more of:

(a) ECC protection on the data;
(b) parity protection on the data;
(c) error status signals;
(d) response codepoints;
(e) special UE ECC word encoding; or
(f) encoded data patterns.

11. The method for protecting the data in a symmetric multiprocessing (SMP) computer according to claim 1, wherein said managing error status is done consistently for a multiplicity of data words, independent of the means for communicating or distributing data error status.

12. The method for protecting the data in a symmetric multiprocessing (SMP) computer according to claim 1, wherein the said step of distributing error status is accompanied by the additional step of:
(f) upon detecting a data error identified as one of said data type errors, forcing said data to a good pattern to avoid future re-detection of the error to allow only the failing components to be implicated in the data type error.

13. The method for protecting the data in a symmetric multiprocessing (SMP) computer according to claim 1, which includes one or more of the additional steps of:
(e) reporting said error status;
(f) initiating recovery based on the error status; and
(g) analyzing the error status to isolate failing components associated with data detected as having a data type error and with its identified data type error.

14. The method for protecting the data in a symmetric multiprocessing (SMP) computer according to claim 13, wherein said step of reporting said error status is done while the machine is still running.

* * * * *